Sept. 12, 1933.  B. B. WESCOTT  1,926,925
PIN, BOLT, AND OTHER CONNECTING DEVICES
Filed April 7, 1931
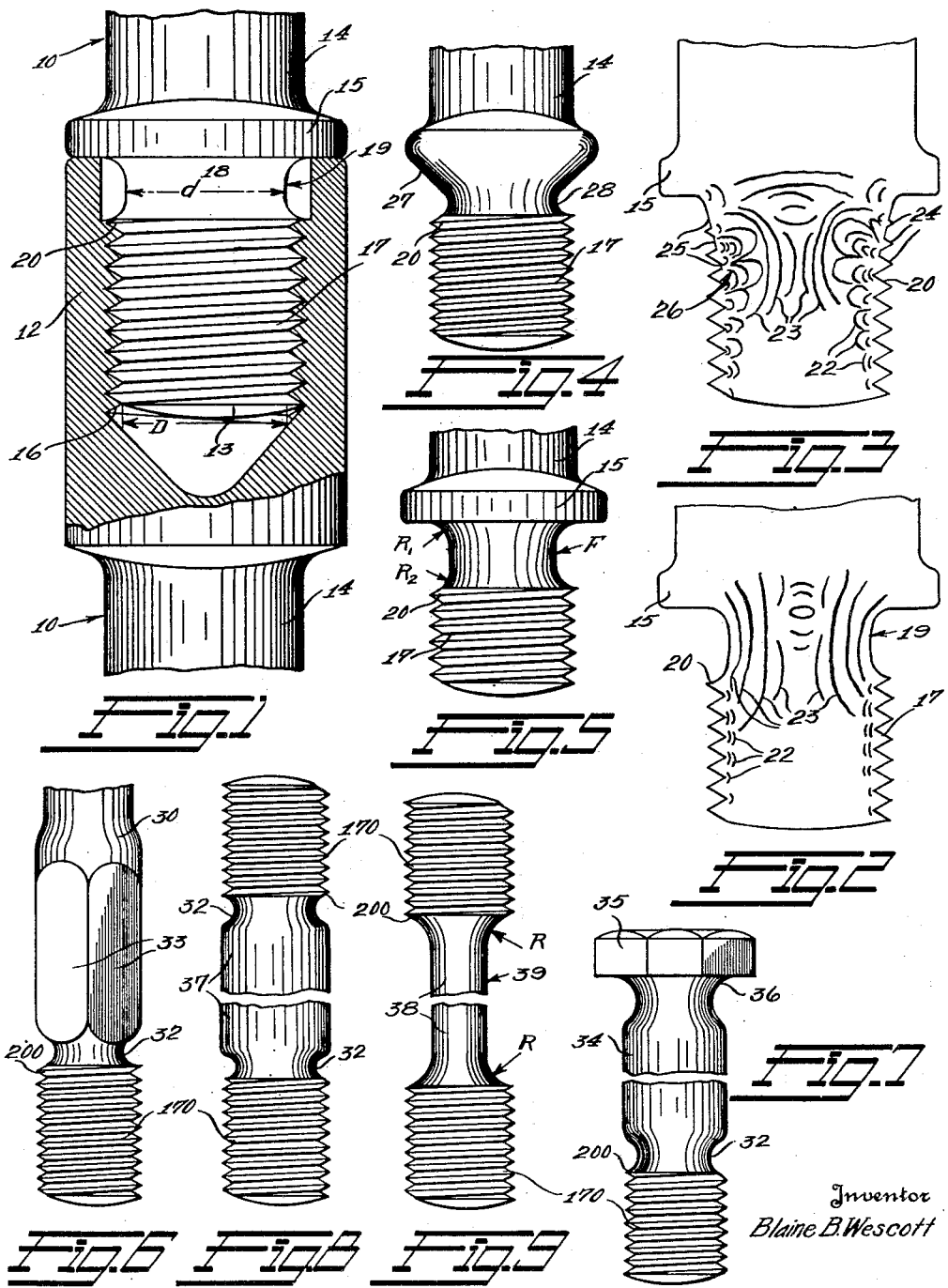
Inventor
Blaine B. Wescott Patented Sept. 12, 1933

1,926,925

UNITED STATES PATENT OFFICE 1,926,925

PIN, BOLT, AND OTHER CONNECTING DEVICE

Blaine B. Wescott, Pittsburgh, Pa., assignor, by mesne assignments, to Gulf Research & Development Corporation, Pittsburgh, Pa., a corporation of Delaware Application April 7, 1931. Serial No. 528,430

8 Claims. (Cl. 287—125)

This invention relates to connecting devices such as pins, bolts and the like, particularly screw-threaded elements of this character that are designed for use in places where they will be subjected to recurrent stresses and vibrations.

Devices of the character above mentioned may have relatively great static tensile strengths, but prior to this invention they were subject to frequent failures resulting from fatigue caused by the intense localization of vibratory stresses. The primary object of my invention is to devise ways and means for preventing an undesirable intensity of localization of such stresses.

The present invention is especially concerned with the joints of sucker rods used in pumping wells, and hence the following description will be chiefly devoted to such joints. It should be understood, however, that the principles of the invention have great importance in their ready application to numerous other connecting devices such for example, as rods or bolts used to hold the component parts of machines and structures together.

There are two common types of sucker rods in general use at the present time. One of them, called the box and pin type rod, has at one end an externally threaded pin and at its other end an internally threaded socket or box. Rods of this type are joined by screwing the pins of one into the box of another. The other type, known as the double pin sucker rod, has a threaded pin at each of its ends; and such rods are joined by separate internally threaded, female couplings into which the pins are screwed at either end. It will thus be seen that each of these two types of sucker rods has at least one integral pin and that such pin forms a part of a joint in a pumping string of rods.

Nearly all sucker rods are designed to meet the specifications of the American Petroleum Institute in regard to the dimensions and details of the pins and boxes. These specifications stipulate the use of the American (National) Standard Screw Thread in the joint, these threads being full or perfect on the end of the pin and then becoming imperfect to gradually vanish toward the root of the pin. Thus the minimum diameter of the pin increases from the last full thread to the end of its threaded section. Experience has developed the common knowledge that a very large proportion of all sucker rod failures (severances) occur in the pins of the joints, and that practically all of the pin failures take place at or adjacent the last full thread near the root of the pin.

I have discovered that these pin failures are the result of the intense localization of vibratory or repetitive stresses set up by the reciprocation of the sucker rod string during pumping operations; and that these failures occur in the pins in spite of the fact that a joint, having the A. P. I. specifications, has a static tensile strength approximately 30% greater than that of the body of the rod itself. The improved joint of the present invention is designed to prevent the severe concentration of the vibratory stresses at any one point and distribute them over such a large area that the fatigue or endurance limit of the metal is not exceeded. The invention is carried out by undercutting the pin, between the last full thread and the body of the rod, to a diameter less than the minor diameter of the threaded section. The undercutting is done in such manner that the cut surface is formed by smooth transitory curves joining the threaded section and the rod body.

Tests show that the undercut pin of the present invention is able to withstand several hundred per cent more repetitions of stress than the old type pin. The efficiency of this method of stress distribution increases as the smoothness of the surface of the undercut section increases. The method is applicable, not only to pins wherever used in rod joints, but also to tie rods, stay-bolts, studs, track bolts and other like fastening elements. The threads may be of various types. Moreover, the undercutting may be done independently of a threaded section as, for example, beneath the head of a bolt. The bodies to be connected by the joint or fastening need not be in flat surface engagement, but may meet on curved or conical surfaces, thereby strengthening the joint and assisting in the prevention of stress localizations.

The major objects of the present invention should be apparent from the foregoing discussion. Further objects, of a minor or subordinate nature, will appear from a study of the following detailed description and the appended claims, when taken in conjunction with the accompanying drawing, wherein:

Figure 1 is a view of a sucker rod joint, with its box in partial section to show the application of the present invention.

Figure 2 is a diagrammatic illustration of the male portion of the joint of Fig. 1 and the manner in which vibratory stresses are distributed through said portion.

Figure 3 is a diagrammatic view similar to Fig. 2 but showing, for purposes of comparison with Fig. 2, the intense localization of stresses in an old type of pin.

Figure 4 is an elevational view of a modified form of sucker rod pin.

Figure 5 is a view similar to Fig. 4, but disclosing a further modification.

Figure 6 shows a still further embodiment of the invention.

Figure 7 illustrates another modification, the invention being applied to a track bolt or the like.

Figure 8 represents a tie rod, track bolt or the like designed in accordance with the principles of this invention.

Figure 9 discloses a flange bolt or stud embodying similar principles.

With continued reference to the drawing, wherein like numerals are employed to designate like parts, and with particular reference for the moment to Fig. 1, a pair of sucker rods 10 of the box and pin type are interconnected in alignment to form a joint comprising the box 12 of one rod and the pin 13 of the other. The box and pin form integral parts of the respective rod bodies 14, the pin being formed on a flanged shoulder 15 and the box being designed to abut the flange when the joint is tightened. Those visible portions of the bodies 14 may be squared or otherwise provided with wrenching surfaces for making and breaking the joint.

The box is provided with internal threads 16 for receiving an externally threaded section 17 of the pin. This section 17 is made up of full, perfect threads and terminates at a distance from the rod to leave an unthreaded or root section 18. The latter is circumferentially undercut by machining to form a smooth and somewhat curved surface 19. This surface 19 may be produced by machining to a single radius, (as in Fig. 8); or to a combination of three radii, (as in Fig. 1); or to a combination of two radii with an intermediate cylindrical or frusto-conical section, (as in Figs. 9 and 5). The important requisites are that the undercut surface should be very smooth and that it should merge nicely into the flange 15 and the last perfect thread 20 of the section 17.

As illustrated, the minimum diameter $d$ of the undercut section 18 is appreciably less than the minor diameter D of the threaded portion of the pin. This is done to ensure that no marks or cuts will remain on the section 18 from the threading operation, and to assist in distributing the vibratory stresses in a manner to prevent their localization adjacent the root of the last thread, 20.

The stress distribution in the pin of Fig. 1 is diagrammatically illustrated in Fig. 2, which represents a longitudinal section without any hatching lines. The vibratory stresses are represented by the numerous lines enclosed within the outline of the figure. It should be observed that the small, relatively sharply curved lines 22 have no tendency to pyramid toward the body of the rod to produce any concentration of stresses adjacent the last thread 20, and that the stresses, represented by the lines 23 of greater magnitude, are forced to straighten out into smooth curves which have their general contours imparted to them by the undercut surface 19. It should further be noted that the ends of the stress lines 23 have little or no tendency to run radially into intersection with the threads.

For purposes of comparison reference may be had to Fig. 3 which represents a similar diagrammatic view of an old type of pin designed to meet the A. P. I. specifications, which call for a series of vanishing imperfect threads 24 between the last perfect thread 20 and the shoulder 15. These threads 24 are imperfect because their roots terminate on a frusto-conical surface 25 that gradually increases from a diameter, equal to the minor diameter of the perfect threads, to a diameter equal to the major thread diameter. It will be observed that the vibratory stress lines are sharper and more pronounced in a pin of this type, that the lines 22 become intensely localized adjacent the last perfect thread as indicated by the arrow 26, and that the lines 23 are bowed in such manner as to further intensify the resultant major localized stress. Numerous pin failures are caused in this manner, the severance occurring adjacent the last full thread where the stress concentration has fatigued the metal beyond its endurance limit.

In Fig. 4 there is shown a modified form of the improved pin of this invention. It has a tapered or conical shouldered surface 27 in lieu of that of the flange 15 of Fig. 1, and it is provided with an undercut section 28 the surface of which is smooth and curved to interconnect the conical surface with the last thread. The tapered shoulder provides a greater frictional area of contact and thus prevents unscrewing of the box and pin, it strengthens the joint and it assists in uniformly distributing the vibratory stresses throughout the body of the pin.

As previously stated the undercut section may be formed by machining to two radii interconnected by a cylindrical surface (if the radii are equal) and by a frusto-conical surface (if the radii are unequal). The last mentioned design is illustrated in Fig. 5, wherein $R_1$ and $R_2$ represent the two unequal radii, and F indicates the frusto-conical surface.

In Fig. 6, the element 30 may be a sucker rod body, a tie rod, or the shank of a staybolt or the like. It has a threaded section 170, and an undercut section 32 between the body 30 and the last full thread 200. The body may be provided with wrenching flats 33.

Fig. 7 shows the principles of this invention adopted in a bolt, tie rod or the like having a body 34 provided with a head 35 and the threaded section 170. In addition to the undercut section 32 adjacent the last thread, the body is provided with a further undercut section 36 immediately below the head. Thus, when such a bolt is utilized to hold the parts of a machine or other structure together, there will be no severe concentration of vibratory or other recurrent stresses that might otherwise cause failure of the bolt body adjacent either the head or the threaded section.

Fig. 8 illustrates the application of the undercutting feature to a track bolt or tie rod having a threaded section 170 at each end of a body 37.

In Fig. 9 there is shown a device similar to that of Fig. 8 and designed to serve as a tie rod, flange bolt, stud, etc. Its body 38 has, in lieu of the two undercut sections 32, one continuous undercut portion comprising a reduced cylindrical surface 39 which is smooth and gradually united with the last thread of each section 170 by machined surfaces having equal radii R, R. This results in a uniform distribution of stresses throughout the entire length of the bolt. The devices of Figs. 8 and 9 may be utilized to intercouple sucker rods or the like, where such rods are designed to have internally threaded boxes formed at both ends of each rod, as disclosed in my copending application S. N. 523,303 filed March 17, 1931. Many types of standard pins, bolts, tie rods etc., may be operated upon by machining undercut surfaces upon them in accordance with the principles of the present invention as described above and illustrated in the several views of the drawing. For example, a bolt capable of withstanding only static stresses may be converted into one which will withstand severe vibratory stresses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In a connecting device of the character described, comprising a body threaded throughout a portion of its length, means for increasing the resistance of said body to failure through the concentration of vibratory stresses at a point within said body, said means comprising a smooth curved surface of substantial length circumferentially cut upon said body adjacent said threaded portion, said smooth surface being cut to a minimum diameter less than the minor thread diameter and having end portions uniformly curved outwardly to merge into portions of said body, said end portions forming the greater part of the length of said surface.

2. In the device set forth in claim 1, said curved surface comprising a circumferential groove machined to a single radius.

3. In claim 1, said curved surface comprising a circumferential groove having its ends machined each to a given relatively large radius and its central portion relatively short and tangent to said ends.

4. In the combination defined in claim 1, said smooth surface comprising a circumferential recess machined to several different radii.

5. A rod, bolt, pin or the like of the character described comprising a straight body of circular cross section throughout its length, a set of complete male threads on each end of said body and designed to cooperate with female threads of devices to be interconnected, and a smooth surface undercut adjacent the inner ends of each set of threads, relatively slightly curved to gradually vanish into the last or innermost thread of the set.

6. A rod coupling member or the like comprising a straight body of circular cross section throughout its length; a set of substantially perfect threads formed on each end of said body, thereby leaving an unthreaded portion between the inner ends of the sets of threads; and a curved smooth surface undercut on said unthreaded portion, said surface being cylindrical at its center and tapering slowly outwardly at its edges to uniformly merge with the inner ends of the sets of threads.

7. In a coupling member of the type comprising a cylindrical body having an integral extension at one end, an end-facing shoulder at the inner end of said extension, and a screw thread on said extension; said extension having means to distribute the breaking strain, said means comprising a zone of substantial length between said shoulder and said thread, at least the central portion of said zone being of a diameter substantially less than that of the valley of said last turn of the thread, and substantially the entire surface of said zone being continuously and smoothly curved in a longitudinal direction with its ends merging outwardly into said shoulder and said last turn of the thread.

8. In a coupling member of the type comprising a cylindrical body having an integral extension at one end, an end-facing shoulder at the inner end of said extension, and a screw thread on said extension; said extension having means to distribute the breaking strain, said means comprising a zone of substantial length between said shoulder and said thread, said zone being of a diameter no greater than that of the valley of said turn of the thread and of a length appreciably less than said diameter, and further being smoothly curved in a longitudinal direction throughout at least a greater portion of its length.

BLAINE B. WESCOTT.